W. L. CAMPBELL.
BOLT LOCKING DEVICE.
APPLICATION FILED SEPT. 18, 1913.
1,231,703.
Patented July 3, 1917.
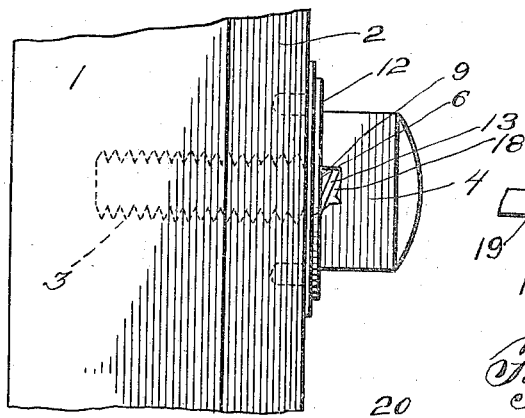
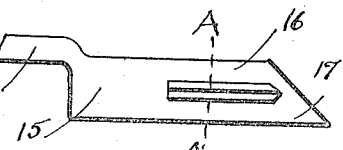
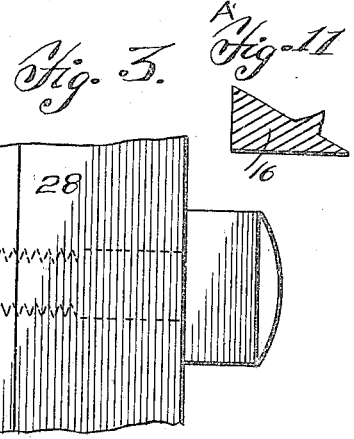
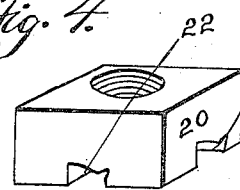
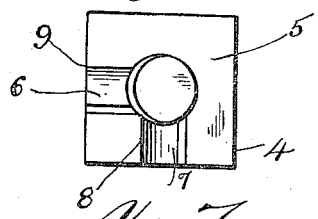
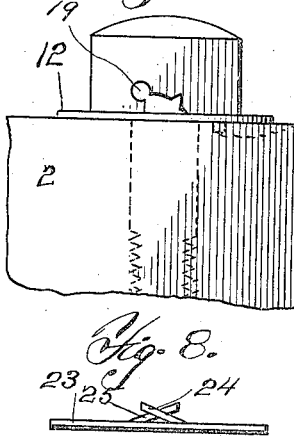
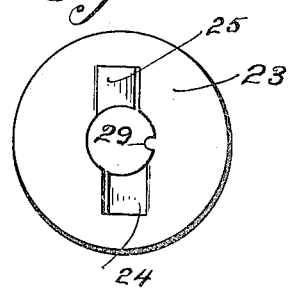
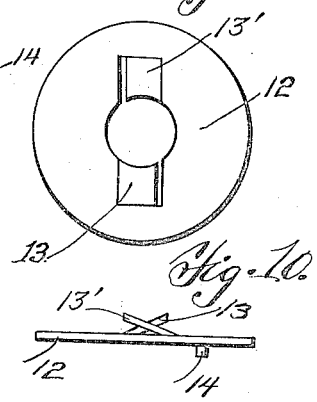
Inventor
Wm. L. Campbell.
By Alex. J. Wedderburn, Jr.
Attorney
Witnesses
O. H. Cook
G. C. Tracy.

UNITED STATES PATENT OFFICE.

WILLIAM LOWELL CAMPBELL, OF BRIDGETON, NEW JERSEY.

BOLT-LOCKING DEVICE.

1,231,703.  Specification of Letters Patent.  Patented July 3, 1917.

Application filed September 18, 1913. Serial No. 790,503.

*To all whom it may concern:*

Be it known that I, WILLIAM LOWELL CAMPBELL, a citizen of the United States, residing at Bridgeton, in the county of Cumberland and State of New Jersey, have invented certain new and useful Improvements in Bolt-Locking Devices, of which the following is a specification.

This invention relates to improvements in a bolt locking device and has for its object to provide a bolt having means whereby the bolt will be prevented from becoming loose after once having been fastened.

Another object of the invention is to provide means for locking a screw bolt against rotation.

The principal object of the invention is to provide means whereby a locked bolt may be unlocked in order that it may be unscrewed.

And still another object of the invention is to provide in combination with a self locking screw bolt a releasing key, said key being adapted to form a screw or nut operating device.

With the above and other objects in view I have invented the device illustrated in the accompanying drawings in which—

Figure 1 is a plan view of a device shown in operated position.

Fig. 2 is an enlarged elevational view of a key lever,

Fig. 3 is a similar view of a modification of the invention,

Fig. 4 is a perspective view of a nut,

Fig. 5 is an end view of the bolt shown in Fig. 1,

Fig. 6 is a plan view showing a key in operated position,

Fig. 7 is a modified form of the combined washer and lock member,

Fig. 8 is an edge view of Fig. 7,

Fig. 9 is a plan view of a combined washer and

Fig. 10 is an end view thereof, and

Fig. 11 is a section on line A—A of Fig. 2.

Like reference characters indicate like parts throughout the specification and in the several views in the drawings in which 1 and 2 indicate a pair of members held together by a screw bolt 3 having a head 4 in the face 5 of which are a pair of opposing recesses 6 and 7 having opposingly inclined walls and vertical walls 8 and 9. The washer 12 is provided with resilient lock members 13 and 13' which are struck outwardly from the body thereof. The members 13 and 13' being adapted to spring into the recesses 6 and 7 as the face 5 of the head 4 is rotated thereagainst when the bolt is screwed into place, the members 13 and 13' engaging one of the vertical walls 8 and 9 of said recesses to prevent the unscrewing of said bolt. Said washer 12 is provided with a lug 14 adapted to be pressed into the member 2 (as illustrated in Fig. 6 in dotted lines), if said member is of wood, or into a recess provided therefor (not shown) if the member 2 is of metal.

15 is a combined key and screw operating device which is provided with a wedge-shaped portion 16 adapted to conform sufficiently to the shape of the recesses 6 and 7 in order that when said portion seats in said recesses the tongue 13 is forced into the plane of the washer 12 whereby the bolt may be unscrewed without interference from said tongue 13. The member 15 is also provided with a pointed inclined end 17 adjacent said portion 16 whereby it may be inserted in the space 18 behind said tongue 13 to force said tongue out of the way of said portion 16. The member 15 is also provided with an offset handle 19 which may be used as a lever to rotate said screw, the wedge 16 holding said tongue 13 out of the way during said rotation.

In Figs. 3, 4, 7 and 8 are illustrated a modification of the device in which a nut 20 adapted to screw on to the screw bolt 21 is provided with recesses 22 of the same formation as the recesses 6 and 7 and the washer 23 is provided with opposing struck out locking members or tongues 24 and 25 which are adapted to engage the recesses 22 in said nut 20. The lug 29 of said washer 23 is slidable in the recess 30 in the screw 21 whereby said member 23 is held against rotation.

Having now described my invention that which I claim to be new and desire to procure by Letters Patent is:—

A lag screw having a head with a plurality of recesses in its inner surface, a washer having a plurality of tongues projecting from one surface thereof adapted to seat in said recesses, said washer having means whereby it will be prevented from rotation, said means consisting of a tooth projecting from the other surface of the washer, adapted to be driven into place by said head in combination with a key adapted to enter one of said recesses to disengage a tongue, said key having a lever whereby said screw may be rotated while said tongue is disengaged.

In testimony whereof I affix my signature in presence of two witnesses.

WILLIAM LOWELL CAMPBELL.

Witnesses:
J. OGDEN BURT,
SAMUEL CAMPBELL.

Copies of this patent may be obtained for five cents each, by addressing the "Commissioner of Patents, Washington, D. C."